United States Patent

Sato et al.

(10) Patent No.: US 9,994,095 B2
(45) Date of Patent: Jun. 12, 2018

(54) WEATHER STRIP FOR AUTOMOBILE

(71) Applicant: NISHIKAWA RUBBER CO., LTD., Hiroshima-shi, Hiroshima-ken (JP)

(72) Inventors: Nobumasa Sato, Fukuyama (JP); Koso Deguchi, Hatsukaichi (JP)

(73) Assignee: NISHIKAWA RUBBER CO., LTD., Hiroshima-Shi, Hiroshima-Ken (JP)

( * ) Notice: Subject to any disclaimer, the term of this patent is extended or adjusted under 35 U.S.C. 154(b) by 0 days. days.

(21) Appl. No.: 15/212,732

(22) Filed: Jul. 18, 2016

(65) Prior Publication Data

US 2017/0021707 A1 Jan. 26, 2017

(30) Foreign Application Priority Data

Jul. 24, 2015 (JP) .................................. 2015-146412

(51) Int. Cl.
*B60J 10/15* (2016.01)
*B60J 10/24* (2016.01)
(Continued)

(52) U.S. Cl.
CPC ............ *B60J 10/15* (2016.02); *B60J 10/16* (2016.02); *B60J 10/24* (2016.02); *B60J 10/265* (2016.02);
(Continued)

(58) Field of Classification Search
None
See application file for complete search history.

(56) References Cited

U.S. PATENT DOCUMENTS 7,318,613 B2 * 1/2008 Hiroe .................. B29C 47/0038
277/652
7,811,504 B2 * 10/2010 Takeuchi .............. B29C 44/005
264/129
(Continued)

FOREIGN PATENT DOCUMENTS

CA 2274639 A1 * 6/1998 .............. B60J 10/00
EP 1457376 A1 9/2004
(Continued)

OTHER PUBLICATIONS

Machine translation of EP-1593538-A1.*
(Continued)

*Primary Examiner* — Katherine W Mitchell
*Assistant Examiner* — Marcus Menezes
(74) *Attorney, Agent, or Firm* — Robert P. Michal, Esq.; Carter, DeLuca, Farrell & Schmidt, LLP

(57) ABSTRACT

A weather strip for an automobile is provided that prevents formation of an electric circuit caused by an intrusion of snow, water or the like. The weather strip includes an installation base member operatively coupled on a body of an automobile at a periphery edge of an opening corresponding to a door, and a hollow seal member integrally molded with the installation base member. The hollow seal member protrudes to a side of the door at an outer side of the automobile and makes an elastic contact with the door when the door is in a closed position. An entire exposed outer surface of the hollow seal member and an outer surface of the installation base member continued from the hollow seal member are formed sequentially by a non-electric conductive material having the volume resistivity of $10^6 \Omega$ or greater.

1 Claim, 9 Drawing Sheets

(51) Int. Cl.
  *B60R 13/06* (2006.01)
  *B60J 10/32* (2016.01)
  *B60J 10/84* (2016.01)
  *B60J 10/265* (2016.01)
  *B60J 10/60* (2016.01)
  *B60J 10/16* (2016.01)

(52) U.S. Cl.
  CPC ............... *B60J 10/32* (2016.02); *B60J 10/60* (2016.02); *B60J 10/84* (2016.02); *B60R 13/06* (2013.01)

(56) References Cited

U.S. PATENT DOCUMENTS

| | | | | |
|---|---|---|---|---|
| 8,205,391 | B2* | 6/2012 | Aritake | B60J 10/16 49/475.1 |
| 8,765,041 | B2* | 7/2014 | Minoura | B29C 45/14409 264/250 |
| 2003/0188491 | A1* | 10/2003 | Aritake | B29C 45/14409 49/490.1 |
| 2004/0060242 | A1* | 4/2004 | Coldre | B60J 10/18 49/490.1 |
| 2005/0048263 | A1* | 3/2005 | Ford | B60J 10/273 428/143 |
| 2006/0162257 | A1* | 7/2006 | Nozaki | B60J 10/16 49/490.1 |
| 2011/0023372 | A1* | 2/2011 | Miyakawa | B29C 47/003 49/490.1 |
| 2012/0240473 | A1 | 9/2012 | Minoura et al. | |
| 2013/0067821 | A1* | 3/2013 | Otsuka | B60J 10/248 49/490.1 |
| 2017/0001502 | A1* | 1/2017 | Daio | B60J 10/25 |
| 2017/0225554 | A1* | 8/2017 | Matsuwaki | B60J 10/15 |

FOREIGN PATENT DOCUMENTS

| | | | |
|---|---|---|---|
| EP | 1593538 A1 * | 11/2005 | ............ B60J 10/17 |
| EP | 1663685 A1 | 6/2006 | |
| JP | 2001-509108 | 7/2001 | |
| WO | WO 98/25780 | 6/1998 | |
| WO | WO-2005028231 A1 | 3/2005 | |

OTHER PUBLICATIONS

Extended European Search Report issued by the European Patent Office in relation to European Patent Application No. 16179771.7-1757 dated Dec. 12, 2016 (7 pages).

* cited by examiner

WEATHER STRIP FOR AUTOMOBILE

CROSS REFERENCE TO RELATED APPLICATION

This application claims the benefit under 35 USC 119 of JP Patent Application JP 2015-146412 filed Jul. 24, 2015, the entire disclosure of which is incorporated herein by reference.

BACKGROUND INFORMATION

The present invention relates to a weather strip for an automobile operatively coupled on a body of an automobile at a peripheral edge of an opening corresponding to a door. The weather strip makes elastic contact with the door, when the door is closed, to thereby seal an inner-cabin side of the automobile from an outer-cabin side thereof.

As shown in FIG. 6, a weather strip 10 is operatively coupled on the body of the automobile at the peripheral edge of the opening corresponding to the back door 100. The weather strip 10 makes an elastic contact with the back door 100 when the back door 100 is closed.

As shown in FIG. 7, the weather strip 10 includes an installation base member 11 and a hollow seal member 12 integrally molded with the installation base member 11. The installation base member 11 has a substantially U-shape cross section provided with an opening and is inserted over a flange 101 from a side of the opening. The flange 101 is formed along a periphery-edges of the opening corresponding to the back door 100. The hollow seal member 12 is provided to an inner wall 11c of the installation base member 11 and is arranged to elastically contact the back door 100 to thereby seal the inner-cabin side of the automobile from the outer-cabin side The installation base member 11 includes a first side wall 11a, a second side wall 11b and a plurality of protruding pieces 13 provided to inner face of the first and second side walls 11a, 11b. The protruding pieces 13 grab the flange 101. The first side wall 11a is provided at tip end thereof with a small lip 14 and at an outer side thereof with a seal lip 15. The second side wall 11b is provided at an outer surface thereof with a decorative lip 16. A sponge or a butyl sealant is attached to an inner surface of the inner wall 11c of the installation base member 11. The sponge or the butyl sealant abuts and encloses a tip end of the flange 101 to thereby prevent corrosion of the flange 101 and intrusion of water. A core material 18 made of metal or rigid resin is embedded in the installation base member 11 for reinforcement of the installation base member 11.

As shown in FIG. 7, in the weather strip 10 for the automobile configured as described above, when dirt 60 containing snow melting salt, for example, is stuck between the first side wall 11a positioned at an outer side of the installation base member 11 and the back door 100, an electric circuit 80 is formed that circulates through the back door 100, the flange 101, the protruding piece 13 provided to the installation base member 11, the first side wall 11a, the dirt 60 containing snow melting salt, and again the back door 100.

In addition, as shown in FIG. 8, if snow or water 70 containing snow melting salt, for example, remains between the second side wall 11b positioned at an inner side of the installation base member 11 and the hollow seal member 12, another electric circuit 90 is formed that circulates through the back door 100, the snow or water 70, the decorative lip 16, the second side wall 11b, the protruding piece 13 provided to the installation base member 11, the flange 101 and again the back door 100.

Thus formed electric circuits 80, 90 could cause the portion 110 (FIG. 7) and the portion 120 (FIG. 8) of the back door 100, through which an electricity flows, to be damaged, and the coatings of the portions 110, 120 could be peeled off, leading to the inner side steel of the back door 100 to be exposed, and resulting in a generation of corrosion and rust in the back door 100.

Besides the abovementioned configurations, there is a known weather strip for an automobile that includes a hollow seal member partially coated with an insulation layer. This configuration is disclosed in Japanese Unexamined Patent Application Publication No. 2001-509108, for example.

Unlike the present invention, the invention disclosed in the abovementioned patent publication is such that a rubber member that is electrically conductive and can be heated is used for a cover seal part and a wiper blade in order to melt frozen water. With this configuration, the insulation layer partially covering the cover seal part, etc. prevents an electrical shock of a user and a damage caused by corrosion.

Specifically, the invention of the patent publication is designed to partially cover a member to be electrically conductive with an insulation layer. Such a configuration does not correspond to the configuration described with reference to FIGS. 7 and 8, in which the electric circuits 80, 90 formed by the dirt 60 or the snow or water 70 containing snow melting salt that is stuck or remains between the installation base member 11 and the back door 100 are shut down so as to prevent corrosion. In addition, the patent publication does not present such an attention or consideration, at all.

It is therefore an object of the present invention to provide a weather strip for an automobile, which weather strip is able to shut down an electric circuit that can be formed caused by an intrusion of snow, water, etc. to thereby effectively prevent generation of corrosion.

SUMMARY

In order to achieve the abovementioned object, according to one aspect of the invention, a weather strip (10) for an automobile is provided, the weather strip (10) for the automobile comprising: an installation base member (11) to be operatively coupled on a body of an automobile at a periphery edge of an opening corresponding to a back door (100); and a hollow seal member (12) integrally molded with the installation base member (11), the hollow seal member (12) protruding from the installation base member (11) toward a side of the back door (100) at an outer-cabin side, the hollow seal member (12) making elastic contact with the back door (100) when the back door (100) is in a closed position, wherein the hollow seal member (12) and the installation base member (11) continued from the hollow seal member (12) each have an exposed outer surface, an outer surface of the hollow seal member (12) being formed wholly by a non-electric conductive material, an outer surface of the installation base member (11) being formed partially or wholly by a non-electric conductive material (30), the two non-electric conductive materials (30) being sequentially continuous, the non-electric conductive materials (30) having the volume resistivity of $10^6 \Omega$ or greater.

It should be noted that forming of an outer surface by a non-electric conductive material described above includes not only the case where an outer surface of the weather strip for the automobile is coated or covered with the non-electric conductive material that is materially different from the weather strip for the automobile, but also includes the case where the outer surface of the weather strip for the automobile is made of the non-electric conductive material without an application of the material that is materially different from the weather strip for the automobile.

In addition, according to an aspect of the invention, at least the outer surface of the hollow seal member (12) and the outer surface of a first side wall (11a) of the installation base member (11) are continuously formed by the non-electric conductive material (30), the first side wall (11a) being located at an outer side of the opening corresponding to the back door (100), the installation base member (11) being continued from the hollow seal member (12).

In addition, according to an aspect of the invention, the first side wall (11a) of the installation base member (11) is provided with a seal lip (15), the seal lip (15) protruding from the first side wall (11a) and making an elastic contact with an periphery edge portion of the opening corresponding to the back door (100), in which at least the outer surface of the hollow seal member (12) and an outer surface of the seal lip (15) are continuously formed by the non-electric conductive material (30).

In addition, according to an aspect of the invention, at least the outer surface of the hollow seal member (12) and an outer surface of a second side wall (11b) of the installation base member (11) are continuously formed by the non-electric conductive material (30), the second side wall (11b) being the installation base member (11) being continued from the hollow seal member (12).

In addition, according to an aspect of the invention, the second side wall (11b) of the installation base member (11) is provided with a decorative lip (16), the decorative lip (16) protruding from the second side wall (11b), in which the outer surface of the hollow seal member (12) and an outer surface of the decorative lip (16) are continuously formed by the non-electric conductive material (30).

Symbols in parentheses show constituents or items corresponding to the drawings.

It should be noted that the "outer-cabin side" refers to a side of the back door (100) facing away from the seal member (12) when the back door (100) is in the closed position, and an "inner-cabin side" refers to the opposite side of the back door (100) that faces the seal member (12). In addition, an "outer side" refers to a side farther from the location of the flange (101), on which the installation base member (11) is operatively coupled, in a direction away from an inner cabinet. An "inner side" refers to a reversed side of the outer side.

According to the weather strip for the automobile in the present invention, the exposed outer surface of the hollow seal member is entirely, and not partially, formed by the non-electric conductive material, and the outer surface of the installation base member continued from the hollow seal member is formed partially or entirely by the non-electric conductive material that is continuous from the non-electric conductive material of the hollow seal member, in which the continuous non-electric conductive material has the volume resistivity of $10\Omega^6$ or greater. In addition to this configuration, the outer surfaces of the hollow seal member and the first side wall of the installation base member located at the outer side of the opening corresponding to the door are continuously formed by the non-electric conductive material, whereby formation of an electric circuit at the outer side of the opening corresponding to the door is prevented. Furthermore, the outer surfaces of the hollow seal member and the second side wall of the installation base member located at the inner side of the opening corresponding to the door are continuously formed by the non-electric conductive material, whereby formation of an electric circuit at the inner side of the opening corresponding to the door is prevented. Moreover, the outer surfaces of the hollow seal member, the first side wall and the second side wall are continuously formed by the non-electric conductive material having the volume resistivity of $10^6\Omega$ or greater, whereby formation of electric circuits at the outer side and the inner side of the opening corresponding to the door is prevented.

Thus, even if dirt containing snow melting salt, for example, is stuck between the first side wall of the installation base member and the door, such an event does not allow a formation of the electric circuit there. Accordingly, the outer side of the door is prevented from any damage caused by electricity, a peeling off of a coating, and corrosion in the damaged area.

In addition, dirt, snow or water containing snow melting salt, for example, stuck or remained between the second side wall and the door does not allow the formation of the electric circuit. This can also prevent any damage at the inner side of the door, the peeling off of the coating, and corrosion at the damaged area.

It should be noted that the feature in which the outer surfaces of the hollow seal member and the installation base member are formed, for the purpose of insulation, by the non-electric conductive material having the volume resistivity of $10^6\Omega$ is not known or acknowledged conventionally.

DETAILED DESCRIPTION

Figure 1:
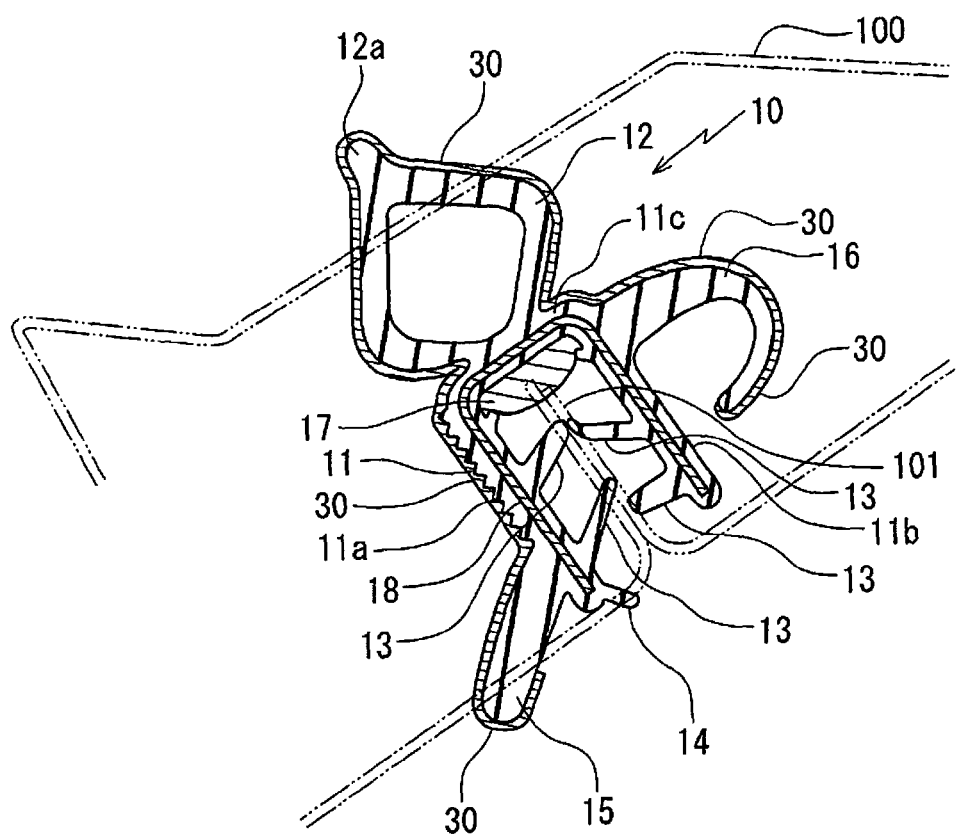
FIG. 1 is an I-I line enlarged cross section of FIG. 6 showing a weather strip for an automobile according to an embodiment of the present invention.

With reference to FIGS. 1 to 6, a weather strip 10 for an automobile according to an embodiment of the present invention will be described. In the weather strip 10, parts or members identical to those of the prior art are provided with the same reference numerals.

Figure 6:
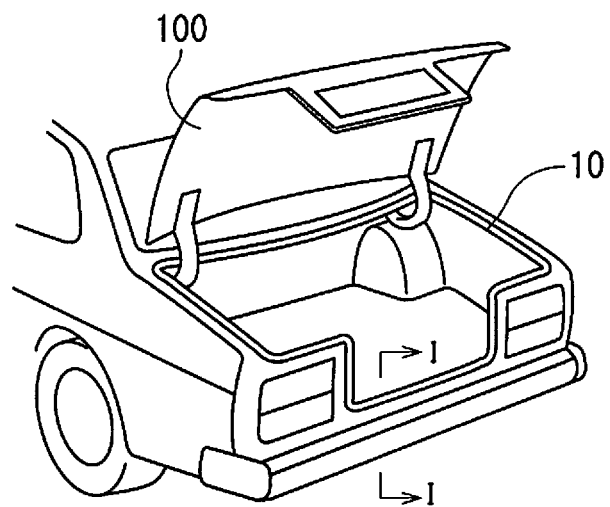
FIG. 6 is a perspective view showing an appearance of an automobile including a back door that is opened.

As shown in FIG. 6, the weather strip 10 for the automobile includes an installation base member 11 and a hollow seal member 12. The installation base member 11 is inserted over a flange 101 that is provided to a body of an automobile along a periphery-edge of an opening corresponding to a back door 100. The hollow seal member 12 is integrally molded with the installation base member 11 at an outer-cabin side thereof and is making elastic contact with the back door 100, when the back door 100 is in a closed position, to thereby seal an inner-cabin side of the automobile from an outer-cabin side thereof.

It should be noted that the "outer-cabin side" refers to a side of the back door 100 facing away from the seal member (12) when the back door 100 is in the closed position, and an "inner-cabin side" refers to the opposite side of the back door (100) that faces the seal member (12) (the side of the flange 101). In addition, an "outer side" refers to a side farther from the location of the flange 101, on which the installation base member 11 is operatively coupled, in a direction away from an inner cabinet. An "inner side" refers to a reversed side of the outer side.

The installation base member 11 includes a first side wall 11a, a second side wall 11b, and an inner wall 11c connecting those side walls 11a, 11b. The installation base member 11 has a U-shape cross section. When the back door 100 is closed, the first side wall 11a becomes substantially perpendicular to a surface of the back door 100, with which the hollow seal member 12 makes an elastic contact, and is disposed at an outer side of the opening corresponding to the back door 100. Similarly, when the back door 100 is in a closed position, the second side wall 11b becomes substantially perpendicular to the surface of the back door 100, with which the hollow seal member 12 makes the elastic contact, and is disposed at an inner side of the opening corresponding to the back door 100. The first and second side walls 11a, 11b are made of, but not limited to, a rubber like elastic solid material such as, for example, ethylene-propylene-diene rubber (EPDM) or a sponge material having the specific gravity greater than 0.4. The first and second side walls 11a, 11b of the installation base member 11 are provided with a plurality of protruding pieces 13 (four in total in this embodiment) that slidably contact the surface of the flange 101 in an insert mounting operation. In addition, the first side wall 11a is provided with a small lip 14 at a tip end or the inner side thereof and a seal lip 15 at the outer side thereof. The second side wall 11b is provided with a decorative lip 16 at the inner side thereof and at a location where the second side wall 11b is connected to the inner wall 11c. The decorative lip 16 has a generally tang-shape cross section. A core member 18 is embedded in the installation base member 11. The core member 18 is made of metal or rigid resin and has a substantially U-shape cross section. A water-sealing sponge or a butyl sealant 17 is provided to an inner surface of the inner wall 11c of the installation base member 11 so as to contact and surrounds the tip end of the flange 101, thereby preventing corrosion of the flange 101 and inhibiting an intrusion of water.

The hollow seal member 12 is connected to the installation base member 11 at the outer face of the inner wall 11c and extends toward the outer-cabin side. The hollow seal member 12 has a substantially diamond-shape cross section, though the shape is not limited, and includes a protruding part 12a that protrudes toward the outer-cabin side. The protruding part 12a is configured to initially contact the back door 100 when the back door 100 is in the closed position. It should be noted that the protruding part 12a may be excluded.

An exposed outer surfaces of the hollow seal member 12 and the continuous first side wall 11a including the seal lip 15 are all and continuously formed by a non-electric conductive material 30. In FIG. 1, although an outer surfaces of the hollow seal member 12 and the first side wall 11a continued from the hollow seal member 12 are viewed to be covered or coated by the non-electric material 30, the outer surfaces in said area may be made of the non-electric conductive material 30, instead the outer surfaces of said area being covered or coated by the non-electric material 30. Such a configuration can satisfy the condition of the configuration of the present invention. Specifically, if the hollow seal member 12 is made of a sponge material or thermoplastic elastomer, for example, the outer surface of the hollow seal member 12 is considered to be made of the non-electric conductive material 30, without an additional material covering or coating the outer surface of the hollow seal member 12. This configuration can be applied in the same manner to the seal lip 15, the installation base member 11 and the decorative lip 16.

The non-electric material 30 may be made of a material having the volume resistivity of $10^6 \Omega$ or greater, and the material used in this embodiment has the volume resistivity of $10^7 \Omega$, upon consideration of a variation in the material.

The material of the non-electric conductive material 30 includes a rubber material such as an EPDM made sponge rubber material, a rubber material such as an EPDM made solid rubber material, and a resin material such as olefin base (TPO) or styrene base (TPS) thermoplastic elastomer (TPE). When the EPDM made solid rubber is used, the electric resistance can be adjusted by selectively choosing the type or amount of carbon black that is normally added to improve the strength, rigidity and weather resistance of the rubber. The EPDM made sponge material, if used, can include many air bubbles and thus is provided with the electric resistance that is smaller than that of the solid rubber material. It is noted that the electric resistance can be adjusted by the size or amount of the air bubbles.

If the type of the non-electric conductive material 30 to be used is a coating film, the film should have a thickness of 0.05 mm or greater, preferably 0.1 mm or greater, and more preferably 0.2 mm or greater. In addition, the film may preferably have the thickness of 1 mm or smaller, and more preferably 0.5 mm.

According to the weather strip 10 for the automobile provided with the abovementioned configuration, the non-electric conductive material 30 having the volume resistivity of $10^6 \Omega$ or greater continuously and wholly covers the exposed outer surfaces of the hollow seal member 12 and the installation base member 11 continued from the hollow seal member 12. Thus, the continuously covered area from the hollow seal member 12 to the first side wall 11a of the installation base member 11 prevents a formation of an electric circuit at the outer side of the opening corresponding to the back door 100. In addition, the continuously covered area from the hollow seal member 12 to the second side wall 11b of the installation base member 11 prevents a formation of the electric circuit at the inner side of the opening corresponding to the back door 100.

Figure 7:
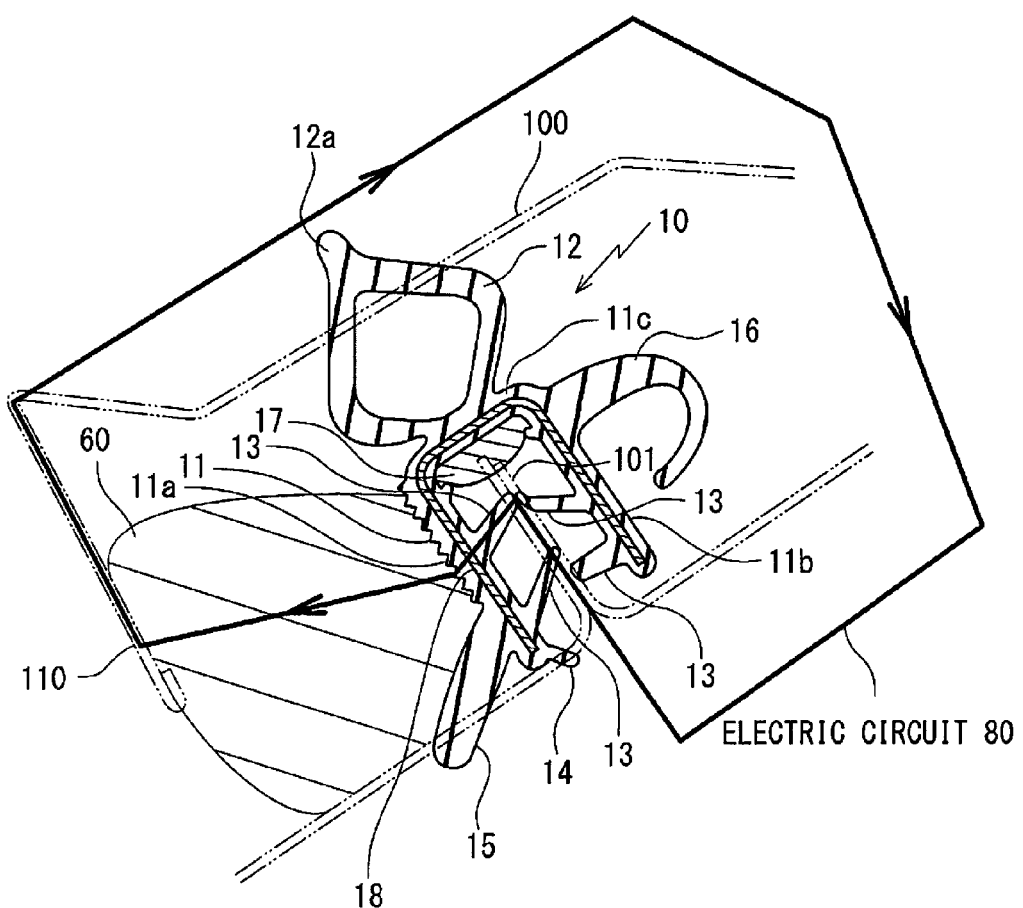
FIG. 7 is an I-I line enlarged cross section of FIG. 6 showing a conventional weather strip for an automobile to which dirt containing snow melting salt is stuck.

Thus, even if dirt 60 containing snow melting salt, for example, is stuck between the first side wall 11a of the installation base member 11 and the back door 100, this configuration successfully prevents a formation of an electric circuit 80 (see FIG. 7), and thereby preventing a damage of the back door 100 at the outer side thereof caused by electricity, which damage can otherwise lead to a peeling off of the coating and corrosion of the damaged area.

Figure 8:
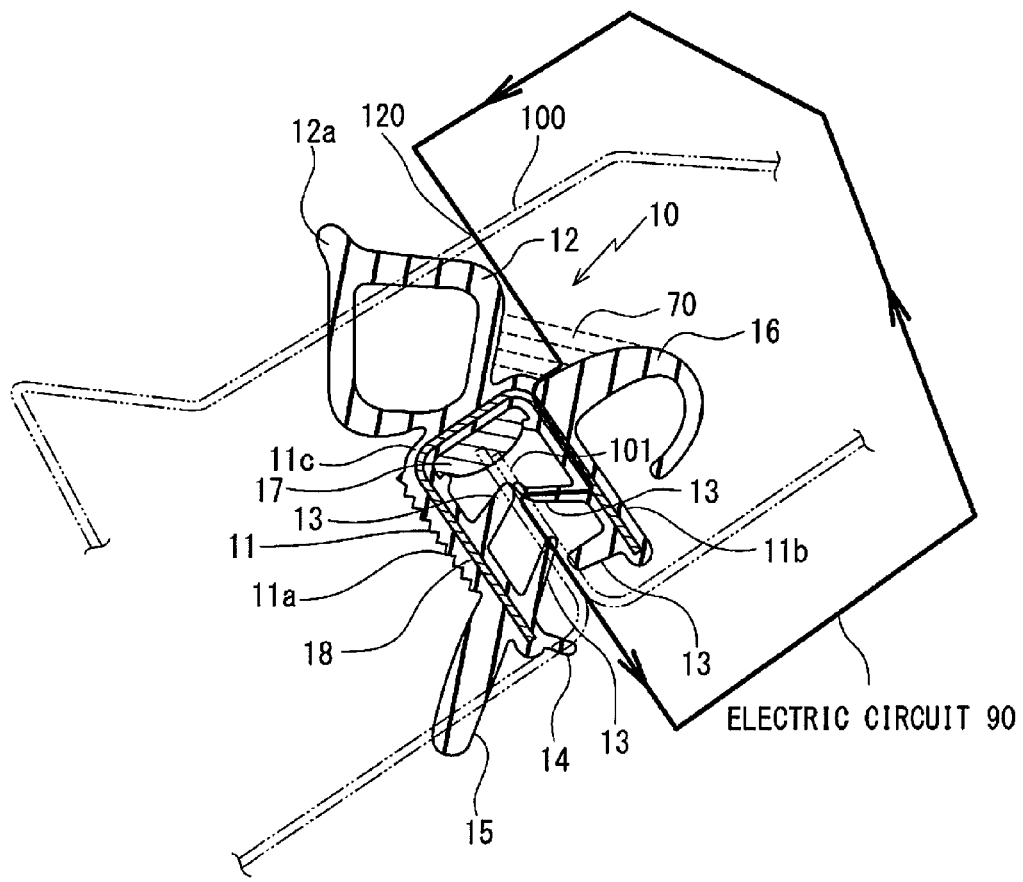
FIG. 8 is an I-I line enlarged cross section of FIG. 6 showing the conventional weather strip for the automobile of FIG. 7 on which water remains.

In addition, this configuration also prevents a formation of an electric circuit 90 (see FIG. 8), even if snow or water containing snow melting salt remains between the second side wall 11b of the installation base member 11 and the back door 100, thereby preventing a damage of the back door 100 at the inner side thereof caused by electricity, which damage can otherwise lead to the peeling off of the coating and corrosion of the damaged area.

Figure 2:
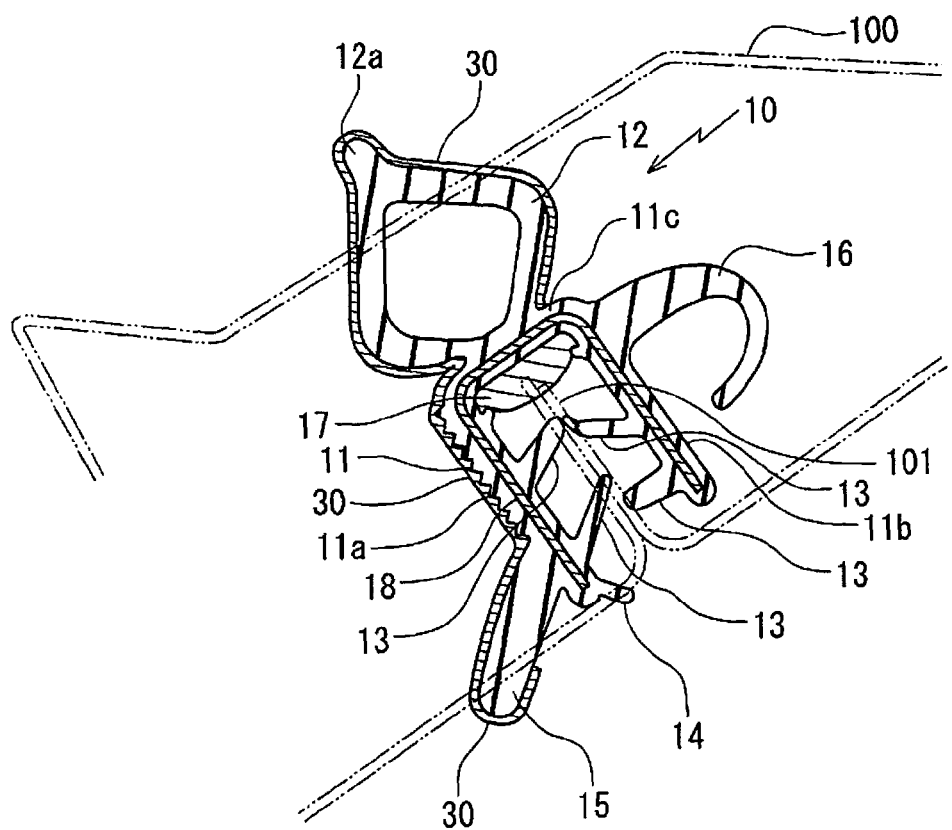
FIG. 2 is an I-I line enlarged cross section of FIG. 6 showing another weather strip for an automobile according to an embodiment of the present invention.
Figure 3:
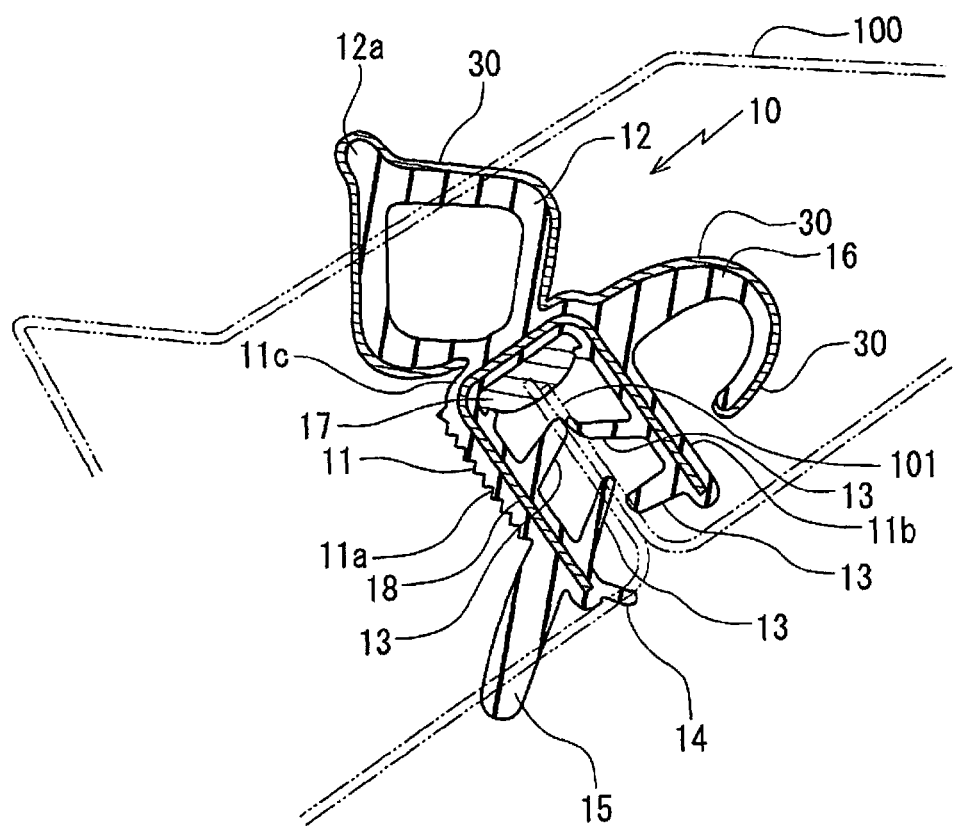
FIG. 3 is an I-I line enlarged cross section of FIG. 6 showing still another weather strip for an automobile according to an embodiment of the present invention.

In the embodiment shown in FIG. 1, the non-electric conductive material 30 continuously forms the outer surface of the hollow seal member 12 and an outer surface of the first side wall 11a of the installation base member 11 continued from the hollow seal member 12, and additionally forms the outer surface of the hollow seal member 12 and an outer surface of the second side wall 11b of the installation base member 11 continued from the hollow seal member 12. Alternatively, as shown in FIG. 2, the non-electric conductive material 30 is allowed to continuously form only the outer surface of the hollow seal member 12 and the outer surface of the first side wall 11a of the installation base member 11 continued from the hollow seal member 12, in order to prevent a formation of the electric circuit 80 (see FIG. 7). Conversely, as shown in FIG. 3, the non-electric conductive material 30 is allowed to continuously form only the outer surface of the hollow seal member 12 and the outer surface of the second side wall 11b of the installation base member 11 continued from the hollow seal member 12, in order to prevent the formation of the electric circuit 90 (see FIG. 8). In these figures, the non-electric conductive material 30 is coated. Coating of the non-electric conductive material 30, however, is unneeded for an outer surface that is made of the non-electric conductive material 30.

Figure 4:
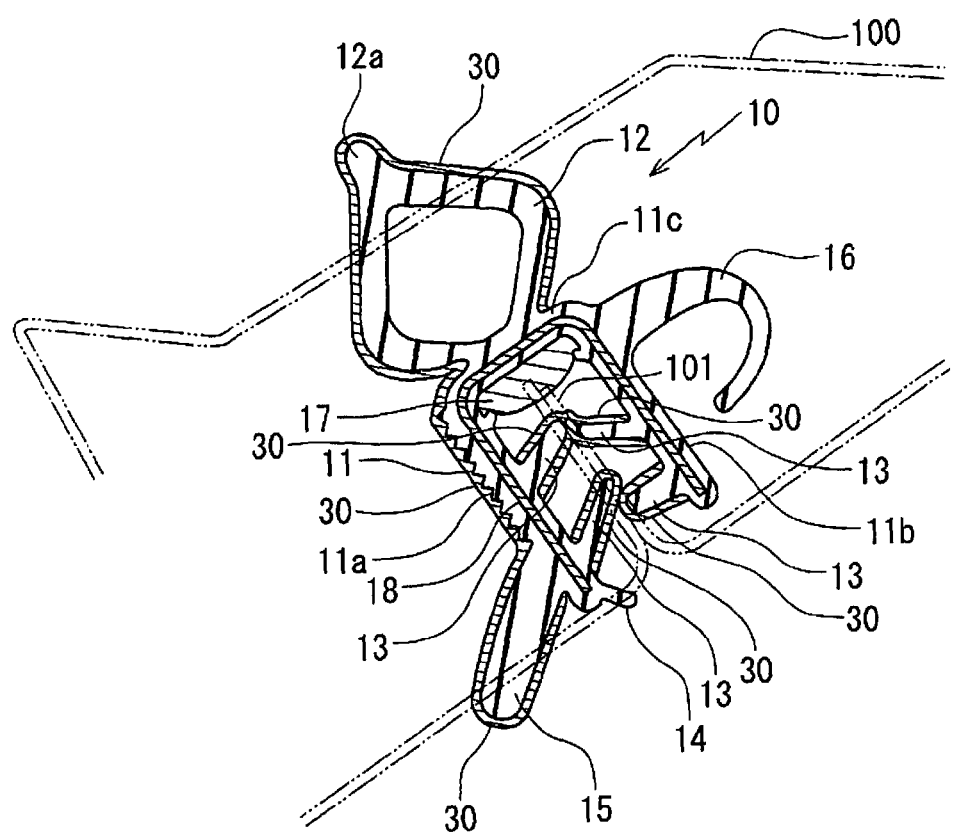
FIG. 4 is an I-I line enlarged cross section of FIG. 6 showing still another weather strip for an automobile according to an embodiment of the present invention.

In addition, as shown in FIG. 4, the non-electric conductive material 30 may continuously form (coated in the figure) the outer surface of the hollow seal member 12 and the outer surface of the first side wall 11a of the installation base member 11 and further forms the exposed entire outer surface of the seal lip 15. Furthermore, the non-electric conductive material 30 may form (coated in the figure) the exposed entire outer surface of the multiple protruding pieces 13 provided to an inner face of the installation base member 11.

Figure 5:
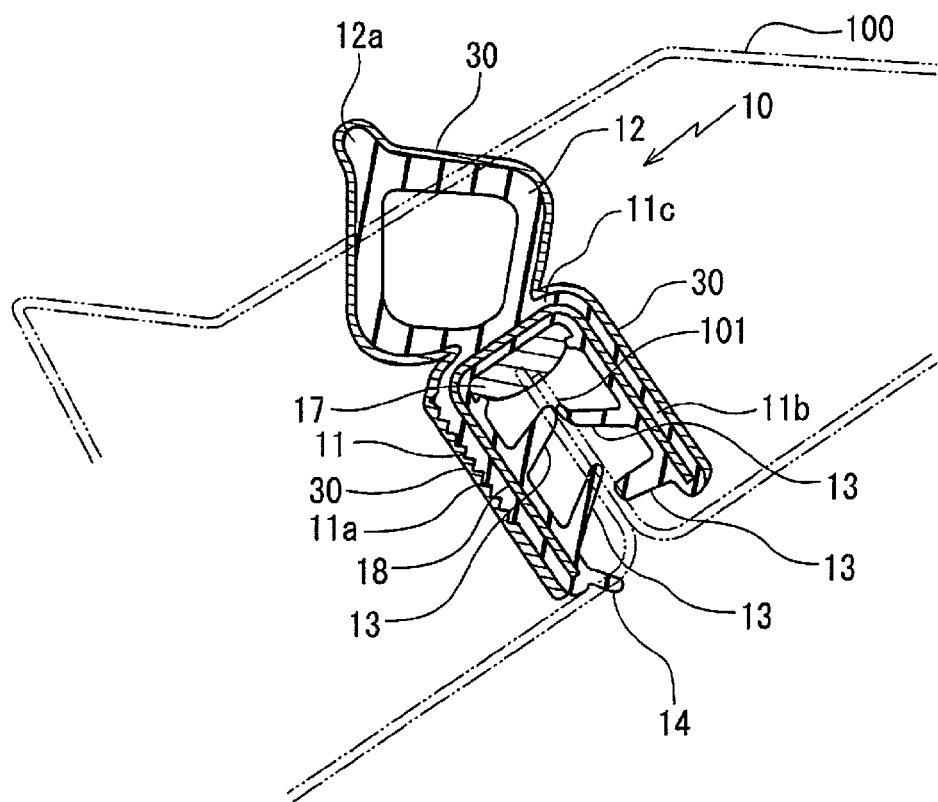
FIG. 5 is an I-I line enlarged cross section of FIG. 6 showing still another weather strip for an automobile according to an embodiment of the present invention.

Moreover, for one type of the installation base member 11 shown in FIG. 5, which is not provided with the seal lip 15 and the decorative lip 16, the non-electric conductive material 30 may be allowed to form (coated in the figure), in a surrounding manner, the outer surfaces of the first and second side walls 11a, 11b.

The configuration of forming the outer surfaces by the non-electric conductive material 30 may be considered that the non-electric conductive material 30 of a different or independent material from the weather strip 10 for the automobile is additionally coated on an outer surfaces of the weather strip 10 for the automobile, as viewed in the embodiments shown in FIGS. 1 to 5. Instead, in the case where the hollow seal member 12, the installation base member 11, the seal lip 15 or the decorative lip 16 of the weather strip for the automobile are made of a material having the volume resistivity of $10^6 \Omega$ or greater, coating of a material different from the material of these members is unneeded. In addition, such a configuration may be considered that the outer surfaces of these members are coated with the non-electric conductive material 30, and may be included in the configuration where the outer surfaces of these members are formed by the non-electric material 30.

This embodiment discloses the weather strip 10 for the automobile that is operatively coupled on the body of the automobile at the periphery edge of the opening corresponding to the back door 100, in which the weather strip 10 for the automobile is arranged to make the elastic contact with the back door 100. Alternatively, the present invention can be applied for other types of doors such as a laterally openable door and an openable/closable door provided to a roof and other locations. Furthermore, the present invention can also be applied for a slide door provided to a side surface of an automobile body.

An electric conductive test was carried out using the weather strip 10 for the automobile shown in FIG. 1.

<Electric Conductive Test>

Figure 9:
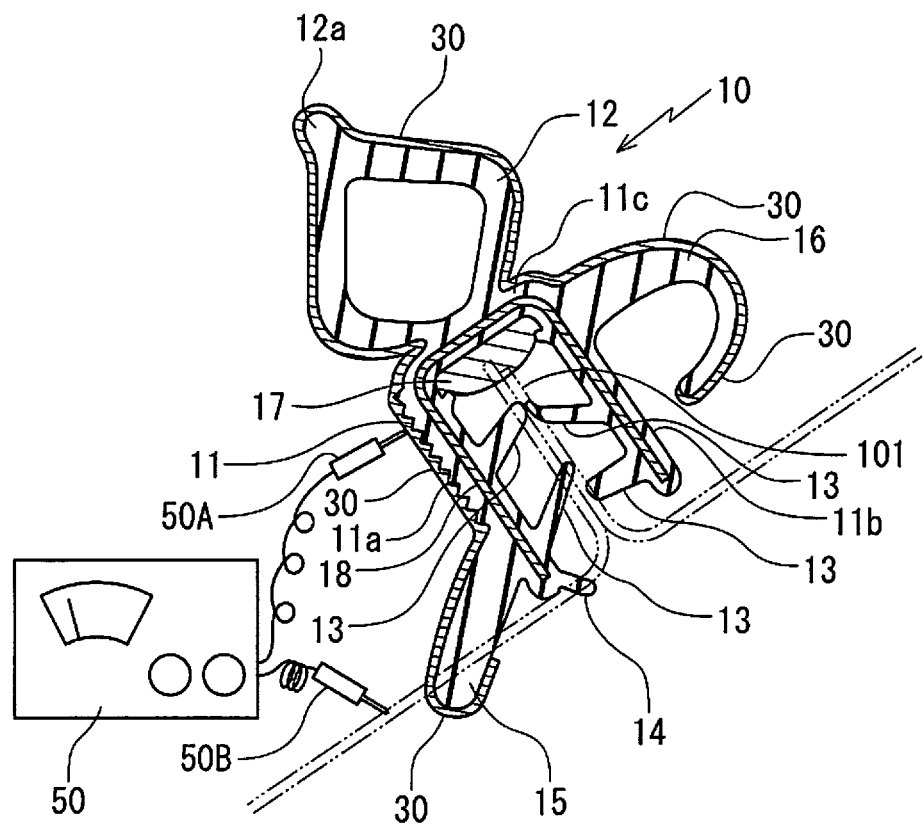
FIG. 9 is an I-I line enlarged cross section of FIG. 6 showing the weather strip for the automobile according to an embodiment of the present invention, the weather strip being subjected to an electric conductive test.

FIG. 9 shows a structure of a weather strip 10 disposed at a trunk or back door located at a rear part of an automobile. The weather strip 10 for the automobile includes an installation base member 11 of a substantially U-shape cross section, which is provided with a plurality of protruding pieces 13 that make a slide contact with surface of a metal made flange 101. The weather strip 10 for the automobile includes an installation base member 11 of a substantially U-shape cross section, which is provided with a plurality of protruding pieces 13 that make a slide contact with surface of a metal made flange 101. The weather strip 10 for the automobile also includes a second side wall 11b, an inner wall 11c and a decorative lip 16 which is provided at a location where the second side wall 11b is joined to the inner wall 11c and has a substantially tang-shape cross section. The installation base member 11, the plurality of protruding pieces 13 and the decorative lip 16 are made of a solid rubber material of an EPDM polymer in which carbon black is added. A metal made core member 18 having a substantially U-shape cross section is embedded in the installation base member 11. The weather strip 10 for the automobile also includes a hollow seal member 12 having a substantially diamond-shape cross section, which hollow seal member 12 is connected to the installation base member 11 at an outer face of the inner wall 11c and is directed toward an outer-cabin side. The weather strip 10 for the automobile further includes a first side wall 11a, a small lip 14 at an inner tip end side of the first side wall 11a, and a seal lip 15 at an outer side of the first side wall 11a. The hollow seal member 12, the small lip 14 and the seal lip 15 are made of a sponge material composed of an EPDM polymer added with carbon black, and has the specific gravity of about 0.5.

The outer surface extending from the hollow seal member 12 to the seal lip 15 is covered with a sponge rubber material that is the same as the material of the hollow seal member 12 and the seal lip 15. The sponge rubber material has a thickness of 0.3 mm.

One terminal 50A of a tester 50 is contacted to an outer surface of the installation base member 11 that is located between the hollow seal member 12 and the seal lip 15 and is covered with the sponge rubber material, while the other terminal 50B of the tester 50 is contacted to a metal made panel extending from the flange 101. Then, 500V is applied between the two terminals 50A, 50B. The tester in this test indicated $2 \times 10^9 \Omega$.

Meanwhile, in a comparative example where the installation base member 11 extending from the hollow seal member 12 to a seal lip 15 is not covered with a sponge material and thus has an exposed solid material, the tester indicated between $0.8 \times 10^9 \Omega$ and $1.5 \times 10^4 \Omega$.

We claim:

1. A weather strip for an automobile, the weather strip comprising:

an installation base member configured to operatively couple to a flange of a body of the automobile at a periphery edge of an opening corresponding to a door, the installation base member having a first side wall located at an outer side of the opening corresponding to the door, the first side wall having an exposed outer surface; and a hollow seal member integrally molded with the installation base member, the hollow seal member protruding from the installation base member toward an outer-cabin side of the door, the hollow seal member configured to make elastic contact with the door when the door is in a closed position, the hollow seal member and the installation base member each have an exposed outer surface, the outer surface of the hollow seal member being formed wholly by a non-electric conductive material, the outer surface of the first side wall of the installation base member being formed partially or wholly by the non-electric conductive material, the non-electric conductive material of the outer surfaces of the hollow seal member and the first side wall of the installation base member forming a continuous outer surface with one another, the non-electric conductive material including a sponge rubber material composed of an EPDM polymer with carbon black having a volume resistivity of $10^6$ $\Omega \cdot$cm or greater, the first side wall of the installation base member including a seal lip protruding from the first side wall and configured to make elastic contact with the periphery edge of the opening corresponding to the door, the seal lip having an outer surface formed of the non-electric conductive material and forming a continuous outer surface with the outer surface of the hollow seal member, wherein the installation base member includes a second side wall located at an inner side of the opening corresponding to the door, the second side wall of the installation base member including a decorative lip protruding from the second side wall, the outer surface of the hollow seal member and an outer surface of the decorative lip forming a continuous outer surface with one another formed of the non-electric conductive material.

* * * * *